US011641667B2

(12) United States Patent
Mu et al.

(10) Patent No.: US 11,641,667 B2
(45) Date of Patent: *May 2, 2023

(54) METHODS, APPARATUSES AND SYSTEMS FOR TRANSMITTING DATA, AND STORAGE MEDIUM

(71) Applicant: BEIJING XIAOMI MOBILE SOFTWARE CO., LTD., Beijing (CN)

(72) Inventors: Qin Mu, Beijing (CN); Ming Zhang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/976,742

(22) Filed: Oct. 28, 2022

(65) Prior Publication Data
US 2023/0084192 A1 Mar. 16, 2023

Related U.S. Application Data

(63) Continuation of application No. 17/094,442, filed on Nov. 10, 2020, now Pat. No. 11,528,744, which is a
(Continued)

(51) Int. Cl.
H04W 74/00 (2009.01)
H04W 72/1268 (2023.01)
(Continued)

(52) U.S. Cl.
CPC ..... H04W 74/004 (2013.01); H04W 72/1268 (2013.01); H04W 72/23 (2023.01); H04W 74/0833 (2013.01); H04W 80/02 (2013.01)

(58) Field of Classification Search
CPC .......... H04W 74/004; H04W 72/1268; H04W 72/23; H04W 74/0833; H04W 80/02
See application file for complete search history.

(56) References Cited

U.S. PATENT DOCUMENTS 9,503,362 B2 11/2016 Sreeramoju
2003/0185193 A1 10/2003 Choi et al.
(Continued)

FOREIGN PATENT DOCUMENTS

CN 1324157 A 11/2001
CN 101057516 A 10/2007
(Continued)

OTHER PUBLICATIONS

International Search Report of PCT Application No. PCT/CN2018/086385 dated Jan. 30, 2019 with English translation, (4p).
(Continued)

Primary Examiner — Dinh Nguyen
(74) Attorney, Agent, or Firm — Arch & Lake LLP

(57) ABSTRACT

Methods, apparatuses and systems are provided for transmitting data. A method includes: sending a target random access preamble to a base station; receiving a target random access response that is sent by the base station based on the target random access preamble and carries repetition-number-indicating information; and transmitting, in accordance with a target transmission repetition number, the target uplink data to the base station during the random access procedure. The target transmission repetition number indicates a number of times the user equipment is configured to repeatedly transmit the target uplink data to the base station during the random access procedure. The target transmission repetition number is determined based on the repetition-number-indicating information and a target transmission block size. The target transmission block size is for the user equipment to transmit the target uplink data to the base station during the random access procedure.

20 Claims, 8 Drawing Sheets

Related U.S. Application Data continuation of application No. PCT/CN2018/086385, filed on May 10, 2018.

(51) Int. Cl.
  H04W 74/08 (2009.01)
  H04W 80/02 (2009.01)
  H04W 72/23 (2023.01)

(56) References Cited

U.S. PATENT DOCUMENTS

| | | | |
|---|---|---|---|
| 2008/0056182 | A1 | 3/2008 | Usuda et al. |
| 2008/0074999 | A1 | 3/2008 | Usuda et al. |
| 2015/0117410 | A1 | 4/2015 | Wu et al. |
| 2016/0239200 | A1 | 8/2016 | Fang |
| 2017/0265193 | A1 | 9/2017 | Wang et al. |
| 2020/0344818 | A1 | 10/2020 | Hoglund et al. |

FOREIGN PATENT DOCUMENTS

| | | |
|---|---|---|
| CN | 105992379 A | 10/2016 |
| EP | 2840517 A2 | 2/2015 |
| RU | 2373649 C2 | 11/2009 |
| WO | 2013181808 A1 | 12/2013 |

OTHER PUBLICATIONS

European Patent Office Extended European Search Report issued in EP Application No. 18917719.9 dated Apr. 21, 2021, (12p).
ISA State Intellectual Property Office of the People's Republic of China, Written Opinion of the International Searching Authority Issued in Application No. PCT/CN2018/086385, dated Jan. 30, 2019, WIPO, (4p).
Ericsson: "TB sizes and UL grant for Msg3", 3GPP Draft; R2-1805178—TB Sizes and UL Grant for Msg3, 3rd Generation Partnership Project (3GPP), Mobile Competence Centre ; 650, Route Des Lucioles ; F-06921 Sophia-Antipolis Cedex ; France, vol. RAN WG2, No. Sanya, P.R. of China; Apr. 16, 2018-Apr. 20, 2018 Apr. 14, 2018, (12p).
Ericsson: "TB sizes and UL grant for Msg3", 3GPP Draft; R2-1803080—TB Sizes and UL Grant for Msg3, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Feb. 26, 2018-Mar. 2, 2018 Feb. 16, 2018, (7p).
Samsung: "Early data transmission for eMTC", 3GPP Draft; R1-1804325, 3rd Generation Partnership Project (3GPP), Mobile Competence Centre ; 650, Route Des Lucioles ; F-06921 Sophia-Antipolis Cedex ; France, vol. RAN WG1, No. Sanya, China; Apr. 16, 2018-Apr. 20, 2018 Apr. 15, 2018, (5p).
Samsung: "Discussion on early data transmission for NB-IoT", 3GPP Draft; R1-1801931 Early Data Transmission for NB-IoT, 3rd Generation Partnership Project (3GPP), Mobile Competence Centre; 650, Route Des Lucioles ; F-06921 Sophia-Antipolis Cedex; France, vol. RAN WG1, No. Athens, Greece; Feb. 26, 2018-Mar. 2, 2018 Feb. 16, 2018, (5p).
State Intellectual Property Office of the People's Republic of China, Office Action and First Office Action and Search Report Issued in Application No. 201880000404.7, dated Jun. 6, 2019, 13 pages. (Submitted with Machine Translation), (13p).
State Intellectual Property Office of the People's Republic of China, Office Action and Third Office Action and Search Report Issued in Application No. 201880000404.7, dated Nov. 2, 2020, (Submitted with Machine Translation), (8p).
LG Electronics, "Data transmission during random access procedure in MTC", 3GPP TSG RAN WG1 Meeting #92bis, Sanya, China, R1-1804516, Apr. 16-20, 2018, (8p).
Huawei, HiSilicon, "Feature lead summary of EDT in eMTC", 3GPP TSG RAN WG1 Meeting #92bis, Sanya, China, R1-1805287, Apr. 16-20, 2018, (5p).
Sony, "On Early Data Transmission over Message 3", 3GPP TSG RAN WG1 Meeting #92bis, Sanya, China, R1-1804603, Apr. 16-20, 2018, (3p).
Ericsson, "Report on [100#38][MTC/NB-IoT] Padding issue in Msg3", 3GPP TSG-RAN WG2 #101, Athens, Greece, R2-1803077, Feb. 26-Mar. 2, 2018, (24p).
Intellectual Property India, Office Action Issued in Application No. 202047053011, dated Jan. 6, 2022, (8 pages).
Japanese Patent Office Action, Office Action Issued in Application No. 2020-563468, dated Jan. 18, 2022, (8 pages). (Submitted with Machine Translation).
Korean Intellectual Property Office, Office Action Issued in Application No. 10-2020-7034994, dated Jan. 13, 2022,(11 pages). (Submitted with Machine Translation).
Ericsson, "[99bis#53][MTC/NB-IoT] EDT indication via PRACH", 3GPP TSG-RAN WG2 #100, R2-1713057, Reno, Nevada, USA, Nov. 27-Dec. 1, 2017, (30 pages).
Xiaomi Communications, "Discussion on remaining issues of EDT for NB-IoT", 3GPP TSG RAN WG1 Meeting #93, R1-1807137, Busan, Korea, May 21-25, 2018, (4 pages).
State Intellectual Property Office of the People's Republic of China, Office Action and Search Report Issued in Application No. 2018800004047, dated Aug. 6, 2019, 14 pages (Submitted with Machine/Partial Translation).
Korean Intellectual Property Office, Office Action Issued in Application No. 10-2020-7034994, dated Jul. 1, 2022, 11 pages. (Submitted with Machine/Partial Translation).

METHODS, APPARATUSES AND SYSTEMS FOR TRANSMITTING DATA, AND STORAGE MEDIUM

CROSS-REFERENCE TO RELATED APPLICATION

This application is a continuation application of U.S. application Ser. No. 17/094,442 filed on Nov. 10, 2020, which is the U.S. national phase of PCT Application No. PCT/CN2018/086385, filed on May 10, 2018, the entire disclosures of both of which are incorporated herein by reference for all purposes.

TECHNICAL FIELD

The present disclosure relates to the field of wireless communication technology, and in particular, relates to methods, apparatuses and systems for transmitting data, and a storage medium.

BACKGROUND

With development of wireless communication technology, Internet of Things has become increasingly common in people's daily lives. The so-called Internet of Things, as its name suggests, is a communication network that connects things to things. In particular, two types of Internet of Things technologies, narrowband Internet of Things (NB-IoT) and machine type communication (MTC), are very promising in application.

For reducing a transmission delay, both the NB-IoT and the MTC may be introduced with an early data transmission (EDT) technology, in which a user equipment (UE) can transmit uplink data during a random access procedure.

Typically, for some uplink data in the NB-IoT or the MTC, the UE is configured to repeatedly transmit the uplink data to a base station so as to ensure a coverage capability of the Internet of Things. Therefore, how the UE repeatedly transmits the uplink data to the base station has become an urgent problem to be solved in the EDT technology.

SUMMARY

The present disclosure provides methods, apparatuses and a system for transmitting data, as well as a storage medium, which solves the problem of how a user equipment repeatedly transmits uplink data to a base station in an EDT technology.

According to a first aspect of the present disclosure, a method of transmitting data includes: sending a target random access preamble to a base station to indicate that user equipment requests to transmit target uplink data to the base station during a random access procedure; receiving a target random access response that is sent by the base station based on the target random access preamble and carries repetition-number-indicating information; and transmitting, in accordance with a target transmission repetition number, the target uplink data to the base station during the random access procedure. The target transmission repetition number indicates a number of times the user equipment is configured to repeatedly transmit the target uplink data to the base station during the random access procedure. The target transmission repetition number is determined based on the repetition-number-indicating information and a target transmission block size. The target transmission block size is for the user equipment to transmit the target uplink data to the base station during the random access procedure.

According to a second aspect of the present disclosure, a method of transmitting data includes: receiving a target random access preamble sent by a user equipment, where the target random access preamble indicates that the user equipment requests to transmit target uplink data to a base station during a random access procedure; sending, based on the target random access preamble, a target random access response to the user equipment. The target random access response carries repetition-number-indicating information for the user equipment to determine a target transmission repetition number based on the repetition-number-indicating information and a target transmission block size. The target transmission repetition number indicates a number of times the user equipment is configured to repeatedly transmit the target uplink data to the base station during the random access procedure. The target transmission block size is for the user equipment to transmit the target uplink data to the base station during the random access procedure. The method further includes receiving, during the random access procedure, the target uplink data that is transmitted by the user equipment in accordance with the target transmission repetition number.

According to a third aspect of the present disclosure, a user equipment includes: at least one processor; and a memory for storing instructions executable by the at least one processor. The at least one processor is configured to: send a target random access preamble to a base station to indicate that the user equipment requests to transmit target uplink data to the base station during a random access procedure; receive a target random access response that is sent by the base station based on the target random access preamble and carries repetition-number-indicating information; and transmit, in accordance with a target transmission repetition number, the target uplink data to the base station during the random access procedure. The target transmission repetition number indicates a number of times the user equipment is configured to repeatedly transmit the target uplink data to the base station during the random access procedure. The target transmission repetition number is determined based on the repetition-number-indicating information and a target transmission block size. The target transmission block size is for the user equipment to transmit the target uplink data to the base station during the random access procedure.

According to a fourth aspect of the present disclosure, a base station includes: at least one processor; and a memory for storing instructions executable by the at least one processor. The at least one processor is configured to: receive a target random access preamble sent by a user equipment, where the target random access preamble indicates that the user equipment requests to transmit target uplink data to the base station during a random access procedure; send, based on the target random access preamble, a target random access response to the user equipment. The target random access response carries repetition-number-indicating information for the user equipment to determine a target transmission repetition number based on the repetition-number-indicating information and a target transmission block size. The target transmission repetition number indicates a number of times the user equipment is configured to repeatedly transmit the target uplink data to the base station during the random access procedure. The target transmission block size is for the user equipment to transmit the target uplink data to the base station during the random access procedure. The at least one processor is further configured to receive, during the random access procedure, the target uplink data that is transmitted by the user equipment in accordance with the target transmission repetition number.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION OF THE EMBODIMENTS

Figure 1:
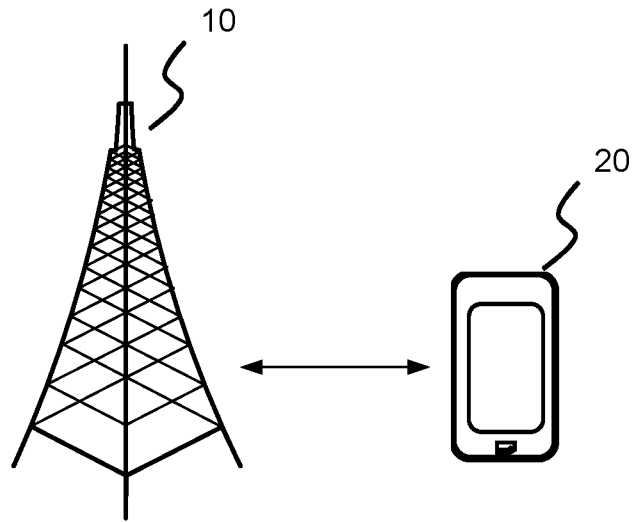
FIG. 1 is a schematic diagram illustrating an implementation environment according to an example.

In order to make the objects, technical solutions and advantages of the present disclosure more apparent, the embodiments of the present disclosure will be further described in detail below with reference to the accompanying drawings.

Exemplary embodiments will be described in detail here with the examples thereof expressed in the drawings. When the following descriptions involve the drawings, like numerals in different drawings refer to like or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

NB-IoT and MTC, as two types of Internet of Things technologies, focus on communication services with low power consumption and wide area.

For enhancing a coverage capability, a transmission repetition mechanism, in which a UE is configured to repeatedly transmit some uplink data to a base station, has been introduced in both the NB-IoT and the MTC. In some embodiments, maximum coupling loss (MCL) is usually applied to characterize the coverage capability, with up to 164 db for the NB-IoT while 155.7 db for the MTC.

In addition, for reducing a transmission delay, both the NB-IoT and the MTC may be introduced with an EDT technology, in which the UE can transmit uplink data during a random access procedure.

At present, however, how to introduce the transmission repetition mechanism in the EDT technology, i.e., how to make the UE repeatedly transmit the uplink data to the base station in the EDT technology, has become an urgent problem to be solved.

The embodiments of the present disclosure provide methods of transmitting data to solve the problem of how the UE repeatedly transmits the uplink data to the base station in the EDT technology. In a method of transmitting data, the base station may send repetition-number-indicating information to the UE through a target random access response, and the UE may determine a target transmission repetition number based on the repetition-number-indicating information and a target transmission block size (TBS, as known as transport block size). In some embodiments, the target transmission repetition number indicates a number of times the UE is configured to repeatedly transmit target uplink data to the base station, with the target uplink data being transmitted by the UE during the random access procedure, and the UE transmitting the target uplink data to the base station in the target TBS. Then, the UE may transmit the target uplink data to the base station during the random access procedure in accordance with the target transmission repetition number, so as to realize that the UE repeatedly transmits the uplink data in the EDT technology.

An implementation environment of the methods of transmitting data according to embodiments of the present disclosure will be described as below.

FIG. 1 is a schematic diagram illustrating the implementation environment of the methods of transmitting data according to examples of the present disclosure. As shown in FIG. 1, there may be a base station 10 and a UE 20 included in the implementation environment. The UE 20 is any one of UEs in a cell served by the base station 10. The base station 10 and the UE 20 may perform a data transmission based on an NB-IoT communication protocol or an MTC communication protocol.

Figure 2:
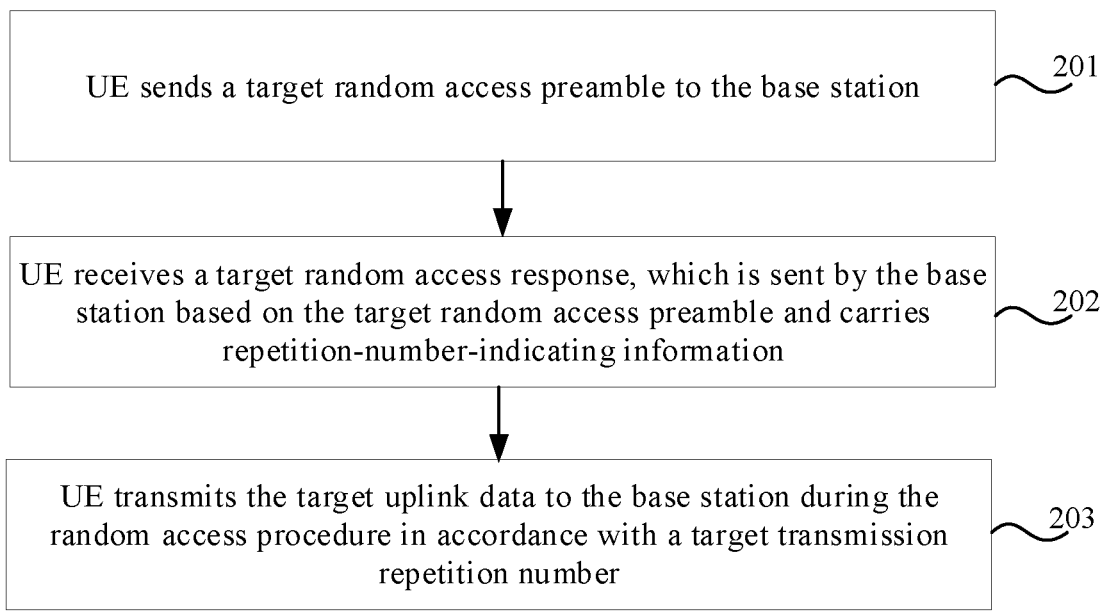
FIG. 2 is a flowchart illustrating a method of transmitting data according to an example.

FIG. 2 is a flow chart illustrating a method of transmitting data according to an example. As shown in FIG. 2, the method of transmitting data is applicable to the UE 20 shown in FIG. 1, and includes the following steps.

At step 201, the UE sends a target random access preamble to the base station.

The target random access preamble indicates that the UE requests to transmit target uplink data to the base station during a random access procedure. In other words, the target random access preamble indicates that the UE is configured to utilize the EDT technology to transmit the target uplink data to the base station.

At step 202, the UE receives a target random access response, which is sent by the base station based on the target random access preamble and carries repetition-number-indicating information.

At step 203, the UE transmits the target uplink data to the base station during the random access procedure in accordance with a target transmission repetition number.

In some embodiments, the target transmission repetition number indicates a number of times the UE is configured to repeatedly transmit the target uplink data to the base station during the random access procedure, and the target transmission repetition number is determined by the UE based on the repetition-number-indicating information and a target TBS. The target TBS is for the UE to transmit the target uplink data to the base station during the random access procedure.

From the foregoing description, according to the method of transmitting data provided by the embodiments of the present disclosure, by receiving repetition-number-indicating information carried in a target random access response sent by a base station, and transmitting, in accordance with a target transmission repetition number, target uplink data to the base station during a random access procedure, where the target transmission repetition number is determined based on the repetition-number-indicating information and a target TBS, a UE in the EDT technology can repeatedly transmit the target uplink data to the base station, thereby solving the problem of how the UE repeatedly transmits uplink data to the base station in the EDT technology.

Figure 3:
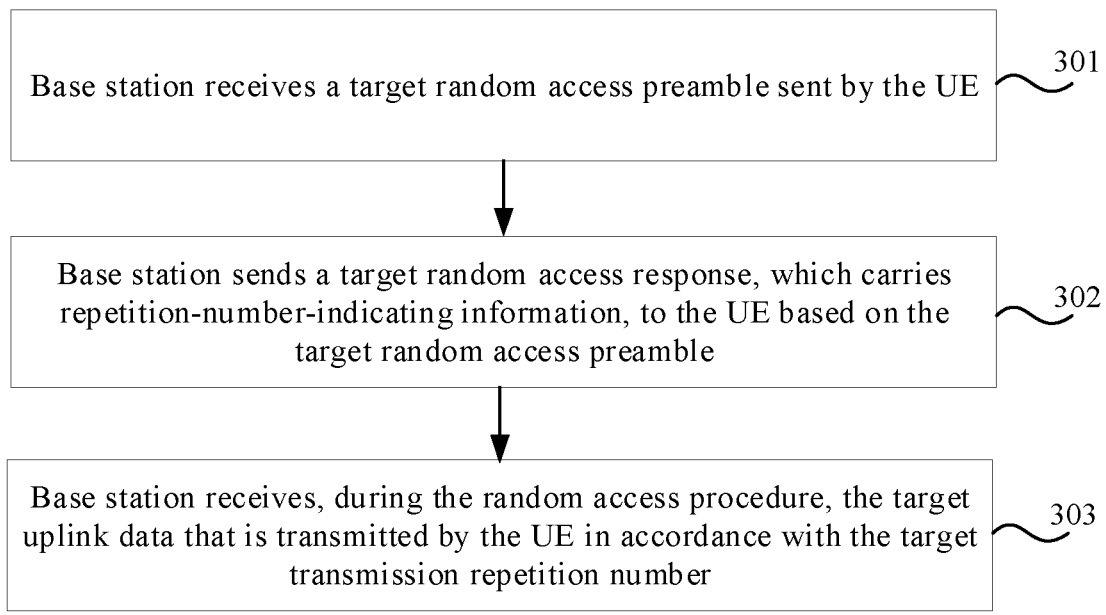
FIG. 3 is a flowchart illustrating a method of transmitting data according to an example.

FIG. 3 is a flow chart illustrating a method of transmitting data according to an example. As shown in FIG. 3, the method of transmitting data is applicable to the base station 10 shown in FIG. 1, and includes the following steps.

At step 301, the base station receives a target random access preamble sent by the UE.

The target random access preamble indicates that the UE requests to transmit target uplink data to the base station during a random access procedure. In other words, the target random access preamble indicates that the UE is configured to utilize the EDT technology to transmit the target uplink data to the base station.

At step 302, the base station sends a target random access response to the UE based on the target random access preamble. The target random access response carries repetition-number-indicating information.

In some embodiments, the repetition-number-indicating information is used for the UE to determine a target transmission repetition number based on the repetition-number-indicating information and a target TBS. The target transmission repetition number indicates a number of times the UE is configured to repeatedly transmit the target uplink data to the base station during the random access procedure. The target TBS is for the UE to transmit the target uplink data to the base station during the random access procedure.

At step 303, the base station receives the target uplink data during the random access procedure. The target uplink data is transmitted by the UE in accordance with the target transmission repetition number.

From the foregoing description, according to the method of transmitting data provided by the embodiments of the present disclosure, by sending repetition-number-indicating information carried in a target random access response to a UE, the UE can transmits, in accordance with a target transmission repetition number, target uplink data to a base station during a random access procedure, where the target transmission repetition number is determined based on the repetition-number-indicating information and a target TBS by the UE, so that the UE in the EDT technology can repeatedly transmit the target uplink data to the base station, thereby solving the problem of how the UE repeatedly transmits uplink data to the base station in the EDT technology.

Figure 4:
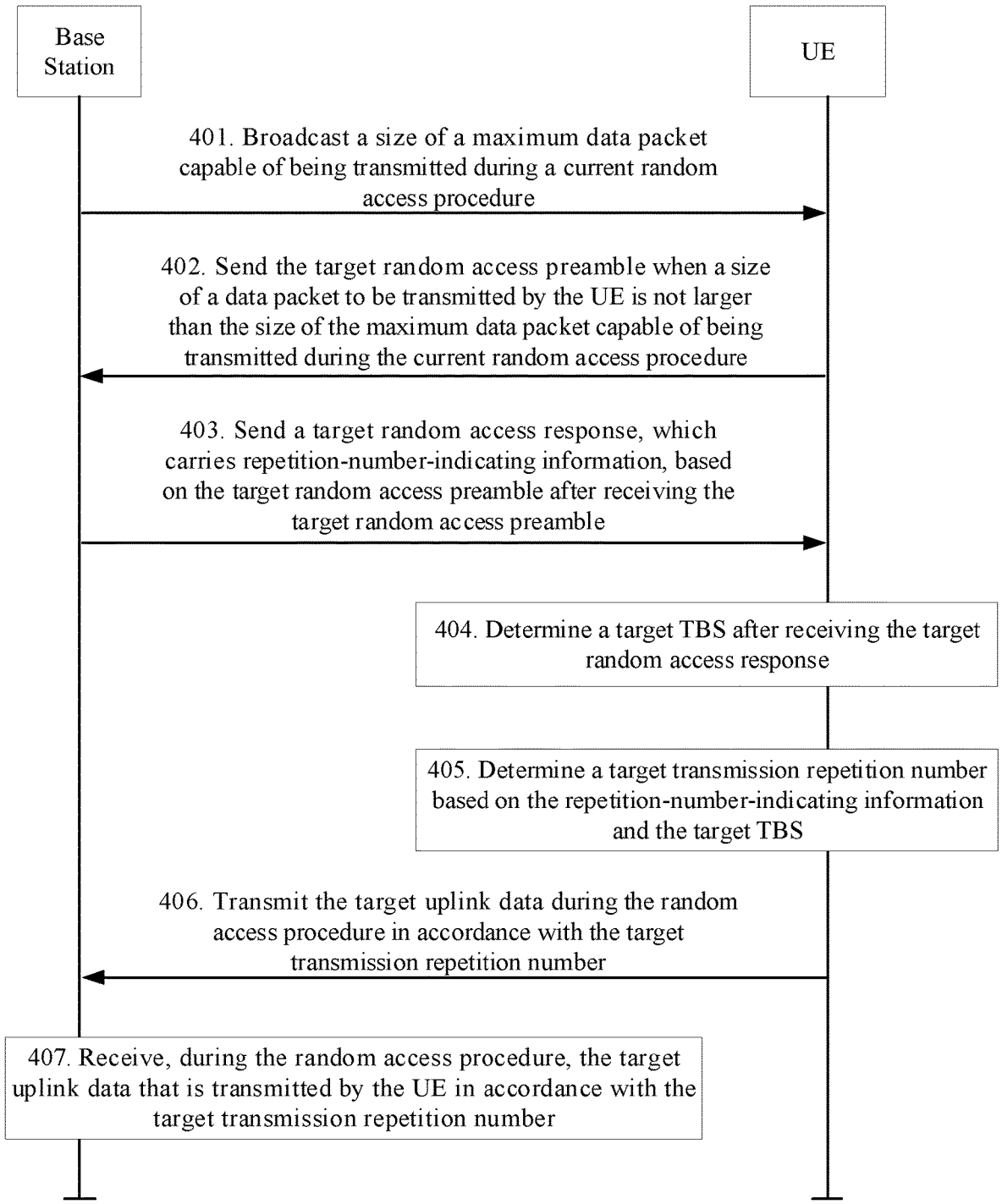
FIG. 4 is a flowchart illustrating a method of transmitting data according to an example.

FIG. 4 is a flowchart illustrating a method of transmitting data according to an example. As shown in FIG. 4, the method of transmitting data is applicable to the implementation environment shown in FIG. 1 and includes the following steps.

At step 401, the base station broadcasts a size of a maximum data packet capable of being transmitted during a current random access procedure.

In the EDT technology, according to a coverage capability of a current network, the base station may select one element from a set of maximum EDT data packets supported by a communication protocol as the size of the maximum data packet supported by the current EDT, i.e., the foregoing size of the maximum data packet capable of being transmitted during the current random access procedure. The set of maximum EDT data packets includes the size of at least one maximum data packet supported by the communication protocol. Then, the base station may send the size of the maximum data packet capable of being transmitted during the current random access procedure to UEs in a cell served by the base station by broadcasting. In some embodiments, the size of the maximum data packet capable of being transmitted during the current random access procedure means a size of a maximum amount of data that the UE is capable of sending to the base station during the random access procedure currently. The above-mentioned communication protocol may be an NB-IoT communication protocol or an MTC communication protocol.

In an actual implementation, the size of the maximum data packet selected by the base station may be positively correlated with the coverage capacity of the current network, that is, the stronger the coverage capacity of the current network is, the larger the size of the maximum data packet selected by the base station can be. Typically, the size of the maximum data packet supported by the communication protocol may include 1000bits, 936bits, 808bits, 680bits, 584bits, 504bits, 408bits, 328bits and the like.

Besides broadcasting the size of the maximum data packet capable of being transmitted during the current random access procedure, the base station may broadcast a time-frequency position of a target uplink resource. The target uplink resource is carried over a random access channel and can carry a random access preamble for requesting to transmit uplink data during the random access procedure.

It should be noted that the random access preamble, in general, may also be called as Message 1 of the random access procedure. In the NB-IoT communication protocol, the random access channel may usually be called as an NB-IoT physical random access channel (NPRACH).

At step 402, the UE sends the target random access preamble to the base station when a size of a data packet to be transmitted by the UE is not larger than the size of the maximum data packet capable of being transmitted during the current random access procedure.

After receiving the size of the maximum data packet capable of being transmitted during the current random access procedure, which is broadcast by the base station, the UE can determine whether the size of the data packet to be transmitted by itself is larger than the size of the maximum data packet capable of being transmitted during the current random access procedure.

When the size of the data packet to be transmitted by the UE is larger than the size of the maximum data packet capable of being transmitted during the current random access procedure, it means that the UE is not capable of transmitting the data packet to be transmitted by itself during the random access procedure. In this case, the UE may perform a traditional random access and after a successful random access, transmit the data packet to be transmitted by the UE to the base station.

When the size of the data packet to be transmitted by the UE is not larger than the size of the maximum data packet capable of being transmitted during the current random access procedure, it means that the UE is capable of transmitting the data packet to be transmitted by itself during the random access procedure. In this case, the UE may determine the target uplink resource based on its time-frequency position that is broadcast by the base station, and send the target random access preamble to the base station through the target uplink resource. The target random access preamble is configured to apply to the base station for transmitting the target uplink data during the random access procedure. In other words, the target random access preamble indicates that the UE requests to transmit the target uplink data to the base station during the random access procedure. The so-called target uplink data here is the data packet to be transmitted by the UE as described above.

At step 403, the base station sends a target random access response to the UE based on the target random access preamble after receiving the target random access preamble sent by the UE. The target random access response carries repetition-number-indicating information.

After receiving the target random access preamble over the target uplink resource, the base station may determine that the UE is configured to transmit the target uplink data during the random access procedure. In this case, the base station may send the target random access response (RAR) to the UE. The target random access response may carry the repetition-number-indicating information. In one or more embodiments of the present disclosure, the target random access response may also carry uplink-resource-indicating information. It should be noted that the random access response, in general, may also be called as Message 2 of the random access procedure.

The uplink-resource-indicating information may indicate a size of an uplink resource allocated by the base station for the UE to transmit single target uplink data packet. The size of the uplink resource may be characterized by a number of resource units (RUs). In one or more embodiments of the present disclosure, the uplink-resource-indicating information may be carried in an uplink scheduling grant (UL grant) for the target random access response. In one or more embodiments, the uplink-resource-indicating information may occupy 3 bits in a modulation and coding scheme field of the uplink scheduling grant.

Table 1 shows exemplary correspondences between the uplink-resource-indicating information and the number of RUs when the size of the maximum data packet capable of being transmitted during the current random access procedure is 1000 bits according to an embodiment of the present disclosure.

TABLE 1

| uplink-resource-indicating information (3 bits in a modulation and coding scheme field) | the number of RUs |
|---|---|
| 011 | 3 |
| 100 | 4 |
| 101 | 5 |
| 110 | 6 |
| 111 | 7 |

As shown in Table 1, under the circumstances that the size of the maximum data packet capable of being transmitted during the current random access procedure is 1000 bits, it is indicated that the uplink resource allocated by the base station to the UE for transmitting the single target uplink data packet is 3 RUs when the uplink-resource-indicating information is "011".

In one or more embodiments of the present disclosure, the foregoing repetition-number-indicating information may also be carried in the uplink scheduling grant for the target random access response. Based on the repetition-number-indicating information, the UE may determine a number of times it is configured to repeatedly transmit the target uplink data to the base station during the random access procedure, which will be described in the following steps.

At step 404, the UE determines a target TBS after receiving the target random access response sent by the base station.

In particular, the target TBS is for the UE to transmit the target uplink data to the base station during the random access procedure.

After receiving the target random access response sent by the base station, the UE determines that the base station allows it to transmit the target uplink data during the random access procedure. In this case, the UE may determine the target TBS based on the size of the data packet to be transmitted by itself, i.e., the size of the target uplink data. In one or more embodiments, the target TBS, among the TBSs available to the UE, is larger than but has a minimum difference from the size of the data packet to be transmitted by the UE. For example, in the case that the size of the maximum packet capable of being transmitted during the current random access procedure is 1000bits, there are 4 TBSs available to the UE in total: 328bits, 536bits, 776bits and 1000bits. If the size of the data packet to be transmitted by the UE is 500bits, the UE may determine the 536 bits as the target TBS.

In one or more embodiments, the UE may determine its available TBSs based on the size of the maximum data packet broadcast by the base station and capable of being transmitted during the current random access procedure, i.e., the size of the maximum data packet supported by the current EDT. Table 2 is a table of correspondences between the sizes of the maximum data packet and the TBSs available to the UE according to an embodiment of the present disclosure.

TABLE 2

| | | a size of a maximum data packet (unit: bits) | | | | | | | |
|---|---|---|---|---|---|---|---|---|---|
| | | 328 | 408 | 504 | 584 | 680 | 808 | 936 | 1000 |
| TBSs available to a UE (unit: bits) | TBS$_1$ | 328 | 328 | 328 | 328 | 328 | 328 | 328 | 328 |
| | TBS$_2$ | | 408 | 408 | 408 | 456 | 504 | 504 | 536 |
| | TBS$_3$ | | | 504 | 504 | 584 | 680 | 712 | 776 |
| | TBS$_4$ | | | | 584 | 680 | 808 | 936 | 1000 |

After determining the target TBS, the UE may determine a modulation and coding scheme for the target uplink data based on the number of the RUs indicated by the uplink-resource-indicating information and based on the target TBS. Normally, under different modulation and coding schemes, an amount of data that each RU is capable of carrying is different from the others. For example, when the number of the RUs indicated by the uplink-resource-indicating information is 4, that is, the uplink resource allocated by the base station for the UE to transmit the single target uplink data packet are 4 RUs, the UE may select one modulation and coding scheme based on the 4 RUs and 328bits if the UE determines the target TBS is the 328bits, in which the average amount of data carried by one RU may be 82bits, or select another modulation and coding scheme based on the 4 RUs and 1000bits if the UE determines the target TBS is the 1000bits, in which the average amount of data carried by one RU may be 250bits.

In one or more embodiments, the modulation and coding scheme for the target uplink data may be quadrature phase shift keying (QPSK), 16 quadrature amplitude modulation (16QAM), 64 quadrature amplitude modulation (64QAM) and the like, which is not specifically limited in the embodiments of the present disclosure.

At step 405, the UE determines a target transmission repetition number based on the repetition-number-indicating information and the target TBS.

The target transmission repetition number indicates a number of times the UE is configured to repeatedly transmit the target uplink data to the base station during the random access procedure.

Generally, under an identical channel condition and an identical amount of resources allocated, the target transmission repetition number is affected by and positively correlated with the target TBS, i.e., the larger the target TBS is, the greater the target transmission repetition number. The reason is that, a larger target TBS requires a greater bit rate at which the UE transmits the target uplink data to the base station, and in the case of the greater bit rate, the UE has to repeatedly transmit the target uplink data to the base station more times to ensure that the base station can correctly receive the target uplink data. In addition, the target transmission repetition number is also affected by and negatively correlated with a quality of a current channel, i.e., the better the quality of the current channel is, the smaller the target transmission repetition number. The reason is that, the better the quality of the current channel is, the fewer times the UE repeatedly transmits the target uplink data to the base station are enough to ensure that the base station can correctly receive the target uplink data.

In view of the above, the target transmission repetition number is affected by not only the target TBS but also the quality of the current channel, and when sending the target random access response to the UE, the base station cannot know in advance the size of the data packet to be transmitted by the UE, i.e., the base station cannot know in advance the target TBS selected by the UE. As a result, the UE cannot determine the target transmission repetition number only based on the target TBS, while the base station cannot indicate the target transmission repetition number directly through the repetition-number-indicating information. Therefore, in some embodiments of the present disclosure, the UE is configured to determine the target transmission repetition number based on the repetition-number-indicating information and the target TBS. In one or more embodiments, the repetition-number-indicating information may be generated by the base station based on the quality of the current channel.

According to some embodiments of the present disclosure, there are provided two exemplary ways for the UE to determine the target transmission repetition number based on the repetition-number-indicating information and the target TBS.

In the first way, the UE determines, based on the repetition-number-indicating information, a target set of correspondences from at least one set of correspondences it stores, and then queries the target set of correspondences based on the target TBS to obtain and determine the transmission repetition number corresponding to the target TBS as the target transmission repetition number.

In this way, the base station may send at least one set of correspondences to the UE in advance through high-layer signaling. In particular, each of the at least one set of correspondences may include at least one correspondence, and the correspondence between TBS and transmission repetition number.

Table 3 shows 4 exemplary sets of correspondences that are sent from the base station to the UE through the higher-layer signaling.

TABLE 3

| set of correspondences 1 | set of correspondences 2 | set of correspondences 3 | set of correspondences 4 |
| --- | --- | --- | --- |
| TBS1 - rep_11; | TBS1 - rep_12; | TBS1 - rep_13; | TBS1 - rep_14; |
| TBS2 - rep_21; | TBS2 - rep_22; | TBS2 - rep_23; | TBS2 - rep_24; |
| TBS3 - rep_31; | TBS3 - rep_32; | TBS3 - rep_33; | TBS3 - rep_34; |
| TBS4 - rep_41 | TBS4 - rep_42 | TBS4 - rep_43 | TBS4 - rep_44 |

According to Table 3, the set of correspondences 1 includes 4 correspondences: TBS1-rep_11, TBS2-rep_21, TBS3-rep_31 and TBS4-rep_41. In particular, TBS1-rep_11 is the correspondence between TBS1 and the transmission repetition number rep_11, and the other correspondences follow the same rule and will not be repeated here in the embodiments of the present disclosure.

In an actual implementation, the set of correspondences sent by the base station to the UE may include a first correspondence and a second correspondence. In particular, the first correspondence includes the first TBS and a first transmission repetition number that correspond to each other, and the second correspondence includes the second TBS and number-indicating information that correspond to each other. The number-indicating information indicates a relative relationship of a second transmission repetition number corresponding to the second TBS with respect to the first transmission repetition number. In one or more embodiments, the relative relationship of the second transmission repetition number with respect to the first transmission repetition number refers to a difference between the second transmission repetition number and the first transmission repetition number.

For example, for the 4 correspondences included in the set of correspondences 1 shown in Table 3 above, TBS1-rep_11 may be the first correspondence, and TBS2-rep_21, TBS3-rep_31 and TBS4-rep_41 may be the second correspondence. In the first correspondence, rep_11 is the transmission repetition number corresponding to TBS1 and is an absolute value. In the second correspondence, however, rep_21, rep_31, and rep_41, as the number-indicating information, indicate the difference between the transmission repetition number corresponding to TBS2 and rep_ 11, the difference between the transmission repetition number corresponding to TBS3 and rep_11, and the difference between the transmission repetition number corresponding to TBS4 and rep_11, respectively.

For the at least one set of correspondences sent by the base station through the high-layer signaling, the UE may store it locally upon receiving it.

After receiving the target random access preamble sent by the UE, the base station may generate the repetition-number-indicating information based on the quality of the current channel, and send it to the UE through the target random access response. The repetition-number-indicating information may indicate one set of correspondences, i.e., the target set of correspondences, in the at least one set of correspondences.

After receiving the target random access response, the UE may extract the repetition-number-indicating information from the target random access response. Then, the UE may determine the target set of correspondences based on the repetition-number-indicating information, query the target set of correspondences based on the target TBS to obtain the transmission repetition number corresponding to the target TBS, and determine the transmission repetition number as the target transmission repetition number.

For example, the target set of correspondences indicated by the repetition-number-indicating information sent by the base station through the target random access response is the set of correspondences 1 shown in Table 3, and the UE has determined that TBS1 is the target TBS. Thus, the UE may query the set of correspondences 1 based on TBS1 to obtain the transmission repetition number corresponding to TBS1, rep_11, and then determine rep_11 as the target transmission repetition number.

In the second way, the repetition-number-indicating information may indicate a third transmission repetition number. In particular, the third transmission repetition number corresponds to the third TBS, and the UE may determine the target transmission repetition number based on the target TBS, the third TBS and the third transmission repetition number.

In this way, the base station may determine a set of transmission repetition numbers based on the quality of the current channel. The set of transmission repetition numbers includes at least one of transmission repetition numbers supported by a communication protocol, and may also include a TBS corresponding to each of the at least one transmission repetition number. Then, the base station sends the set of transmission repetition numbers to the UE through the high-layer signaling. For the set of transmission repetition numbers, the UE may store it locally upon receiving it.

After receiving the target random access preamble sent by the UE, the base station may select a transmission repetition number from the set of transmission repetition numbers, i.e., the third transmission repetition number. In one or more embodiments, the transmission repetition number selected by the base station may be a minimum or maximum transmission repetition number in the set of transmission repetition numbers.

Then, the base station may generate the repetition-number-indicating information for indicating the selected transmission repetition number, i.e., the third transmission repetition number, and send the repetition-number-indicating information to the UE through the target random access response.

After receiving the target random access response, the UE may extract the repetition-number-indicating information from the target random access response, and then determine the target transmission repetition number based on the target TBS, the third TBS, and the third transmission repetition number.

According to the embodiments of the present disclosure, there are provided two possible implementations for the UE to determine the target transmission repetition number based on the target TBS, the third TBS, and the third transmission repetition number.

In the first possible implementation, the UE may determine a first relative relationship of the target transmission repetition number with respect to the third transmission repetition number based on a relative relationship of the target TBS with respect to the third TBS. Then, the UE may determine the target transmission repetition number based on the first relative relationship and the third transmission repetition number.

In one or more embodiments, the relative relationship of the target TBS with respect to the third TBS may be a proportional relationship of the target TBS with respect to the third TBS, and the first relative relationship may be a proportional relationship of the target transmission repetition number with respect to the third transmission repetition number.

In this implementation, the target transmission repetition number is associated with a formula $rep\_x*(TBS\_y/TBS\_x)$. In a specific embodiment, the UE may calculate the target transmission repetition number based on a first formula that is:

$$rep\_y=ceil[rep\_x*(TBS\_y/TBS\_x)];$$

where rep_y is the target transmission repetition number, cell is a ceiling operator, rep_x is the third transmission repetition number, TBS_y is the target TBS, and TBS_x is the third TBS.

In the second possible implementation, the UE may determine a second relative relationship of a reference transmission repetition number with respect to the third transmission repetition number based on the relative relationship of the target TBS with respect to the third TBS. Then, the UE may determine the reference transmission repetition number based on the second relative relationship and the third transmission repetition number, and determine the target transmission repetition number based on the reference transmission repetition number.

In one or more embodiments, the relative relationship of the target TBS with respect to the third TBS may be a proportional relationship of the target TBS with respect to the third TBS, and the second relative relationship may be a proportional relationship of the reference transmission repetition number with respect to the third transmission repetition number.

In this implementation, the reference transmission repetition number is associated with the formula $rep\_x*(TBS\_y/TBS\_x)$. In a specific embodiment, the UE may calculate the reference transmission repetition number based on a second formula that is:

$$rep\_z=ceil[rep\_x*(TBS\_y/TBS\_x)];$$

where rep_z is the reference transmission repetition number, cell is a ceiling operator, rep_x is the third transmission repetition number, TBS_y is the target TBS, and TBS_x is the third TBS.

According to the embodiments of the present disclosure, two possible implementations are provided for the UE to determine the target transmission repetition number based on the reference transmission repetition number.

In the first possible implementation, the UE determines the target transmission repetition number based on the reference transmission repetition number. The target transmission repetition number is of a value, among a target set of values, that has a minimum difference from the reference transmission repetition number. In an optional embodiment, the minimum difference may be configured to be a positive value or an absolute value. For instance, when it's configured that the minimum difference is the positive value, the target transmission repetition number is of a value, among the target set of values, which is larger than the reference transmission repetition number and has the minimum difference value from the reference transmission repetition number. The target set of values includes at least one value and each value included in the target set of values is an integer multiple of a first preset value or an integer power of a second preset value.

In one or more embodiments, the first preset value and the second preset value may be identical or different. In one or more embodiments of the present disclosure, both the first preset value and the second preset value may be 2.

In the second possible implementation, the UE determines the target transmission repetition number based on the reference transmission repetition number. The target transmission repetition number is one of the transmission repetition numbers supported by the communication protocol, which has a minimum difference from the reference transmission repetition number. In an optional embodiment, the minimum difference may be configured to be a positive value or an absolute value. For instance, when it's configured that the minimum difference is the positive value, the target transmission repetition number is one of the transmission repetition numbers supported by the communication protocol, which is larger than the reference transmission repetition number and has the minimum difference value from the reference transmission repetition number.

At step 406, the UE transmits the target uplink data to the base station during the random access procedure in accordance with the target transmission repetition number.

In the EDT technology, the UE may transmit the target uplink data to the base station through Message 3 of the random access procedure.

The UE may modulate and code the target uplink data in accordance with the modulation and coding scheme that is determined by itself based on the number of RUs indicated by the uplink-resource-indicating information and the target TBS, and then repeatedly transmit the modulated and encoded target uplink data to the base station. Particularly, the number of times the UE is configured to repeatedly transmit the modulated and coded target uplink data to the base station is indicated by the target transmission repetition number.

At step 407, during the random access procedure, the base station receives the target uplink data that is transmitted by the UE in accordance with the target transmission repetition number.

For the step 407, since the base station cannot know in advance the target TBS selected by the UE, the base station may test the uplink resource carrying the target uplink data with available TBSs sequentially until obtaining a TBS in which the target uplink data is capable of being correctly received, i.e., the target TBS.

The base station may determine the target transmission repetition number based on the target TBS and the repetition-number-indicating information, and receive, in accordance with the target transmission repetition number, the target uplink data transmitted by the UE.

The present disclosure also provides a method for transmitting data, being applicable to a UE, comprising:

sending a target random access preamble to a base station to indicate that the UE requests to transmit target uplink data to the base station during a random access procedure;

receiving a target random access response associated with the target random access preamble from the base station, where the target random access response carries repetition-number-indicating information, and where the repetition-number-indicating information indicates a third transmission repetition number corresponding to a third TBS;

determining a reference transmission repetition number based on a target TBS, the third TBS and the third transmission repetition number, where the reference transmission repetition number is associated with a formula: rep_x*(TBS_y/TBS_x), with rep_x being the third transmission repetition number, TBS_y being the target TBS, and TBS_x being the third TBS, and where the target TBS is for the UE to transmit the target uplink data to the base station during the random access procedure;

determining a target transmission repetition number based on the reference transmission repetition number, where the target transmission repetition number indicates a number of times the UE is configured to repeatedly transmit the target uplink data to the base station during the random access procedure, and where the target transmission repetition number is of a value, among a target set of values, which is larger than the reference transmission repetition number and has the minimum difference value from the reference transmission repetition number; and transmitting, in accordance with the target transmission repetition number, the target uplink data to the base station during the random access procedure.

In one embodiment, the target set of values includes at least one value and each value included in the target set of values is an integer multiple of a first preset value or an integer power of a second preset value.

The present disclosure further provides a method for transmitting data, being applicable to a base station, comprising:

receiving a target random access preamble from a use equipment, where the target random access preamble indicates that a UE requests to transmit target uplink data to the base station during a random access procedure;

sending a target random access response associated with the target random access preamble to the UE, where the target random access response carries repetition-number-indicating information, and the repetition-number-indicating information indicates a third transmission repetition number corresponding to a third TBS, where the third TBS and the third transmission repetition number, in combination with a target TBS, are for the UE to determine a reference transmission repetition number, and the target TBS is for the UE to transmit the target uplink data to the base station during the random access procedure, where the reference transmission repetition number is associated with a formula: rep_x*(TBS_y/TBS_x), with rep_x being the third transmission repetition number, TBS_y being the target TBS, and TBS_x being the third TBS, and where the reference transmission repetition number is for the UE to determine a target transmission repetition number, the target transmission repetition number indicates a number of times the UE is configured to repeatedly transmit the target uplink data to the base station during the random access procedure, and the target transmission repetition number is of a value, among a target set of values, which is larger than the reference transmission repetition number and has the minimum difference value from the reference transmission repetition number; and receiving, during the random access procedure, the target uplink data that is transmitted by the user equipment in accordance with the target transmission repetition number.

In one embodiment, the target set of values includes at least one value and each value included in the target set of values is an integer multiple of a first preset value or an integer power of a second preset value.

From the foregoing description, according to the method of transmitting data provided by the embodiments of the present disclosure, by receiving repetition-number-indicating information carried in a target random access response sent by a base station, and transmitting, in accordance with a target transmission repetition number, target uplink data to the base station during a random access procedure, where the target transmission repetition number is determined based on the repetition-number-indicating information and a target TBS, a UE in the EDT technology can repeatedly transmit the target uplink data to the base station, thereby solving the problem of how the UE repeatedly transmits uplink data to the base station in the EDT technology.

Figure 5:
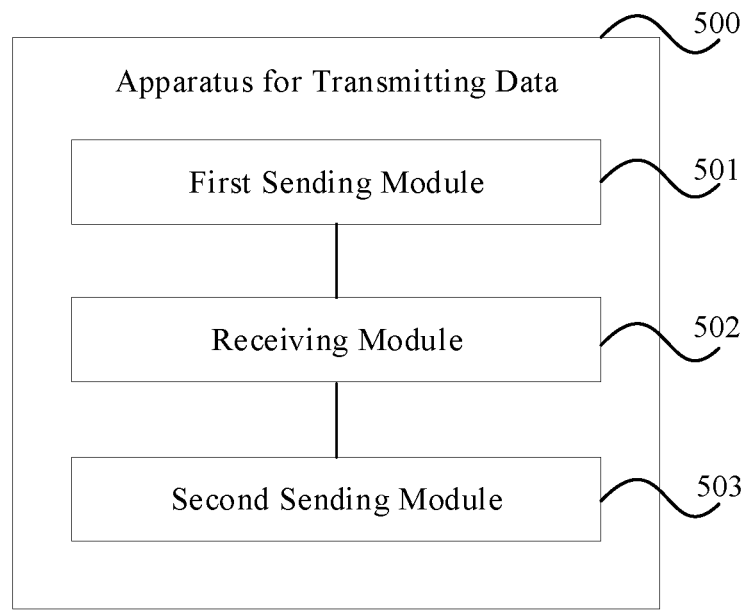
FIG. 5 is a block diagram illustrating an apparatus for transmitting data according to an example.

FIG. 5 is a block diagram illustrating an apparatus 500 for transmitting data according to an example. The apparatus 500 for transmitting data may be installed in the UE 20 shown in FIG. 1. Referring to FIG. 5, the apparatus 500 for transmitting data includes a first sending module 501, a receiving module 502 and a second sending module 503.

The first sending module 501 is configured to send a target random access preamble to a base station to indicate that the UE requests to transmit target uplink data to the base station during a random access procedure.

The receiving module 502 is configured to receive a target random access response. The target random access response is sent by the base station based on the target random access preamble and carries repetition-number-indicating information.

The second sending module 503 is configured to transmit the target uplink data to the base station during the random access procedure in accordance with a target transmission repetition number.

In some embodiments, the target transmission repetition number indicates a number of times the UE is configured to repeatedly transmit the target uplink data to the base station during the random access procedure, and the target transmission repetition number is determined based on the repetition-number-indicating information and a target TBS. The target TBS is for the UE to transmit the target uplink data to the base station during the random access procedure.

In one or more embodiments of the present disclosure, the repetition-number-indicating information is carried in an uplink scheduling grant for the target random access response.

Figure 6:
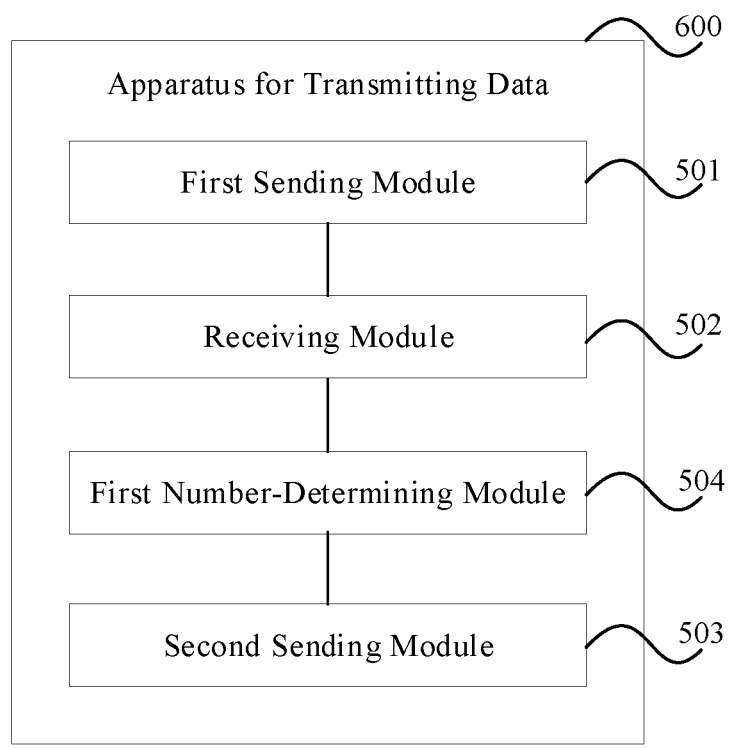
FIG. 6 is a block diagram illustrating an apparatus for transmitting data according to an example.

As shown in FIG. 6, according to an embodiment of the present disclosure, there is provided another apparatus 600 for transmitting data. In addition to the modules included by the apparatus 500 for transmitting data, the apparatus 600 for transmitting data includes a first number-determining module 504.

Figure 7:
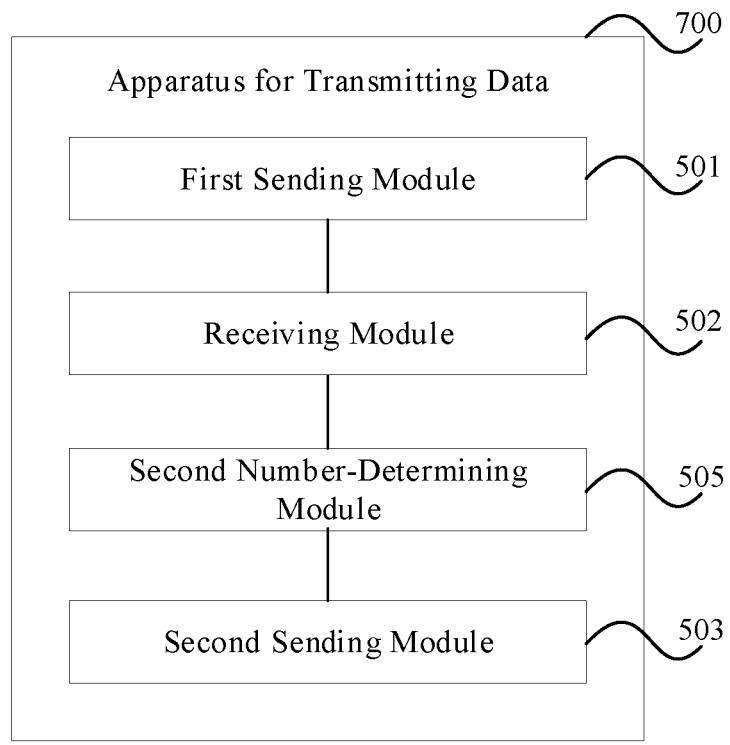
FIG. 7 is a block diagram illustrating an apparatus for transmitting data according to an example.

As shown in FIG. 7, according to an embodiment of the present disclosure, there is provided another apparatus 700 for transmitting data. In addition to the modules included by the apparatus 500 for transmitting data, the apparatus 700 for transmitting data includes a second number-determining module 505.

Here, on the basis of the modules included by the apparatus 500 for transmitting data, the apparatus for transmitting data according to the embodiments of the present disclosure may include the first number-determining module 504 and the second number-determining module 505 at the same time.

In one or more embodiments of the present disclosure, at least one set of correspondences is stored in the UE. Each of the at least one set of correspondences includes at least one correspondence between TBS and transmission repetition number. The first number-determining module 504 includes:

a set-determining submodule that is configured to determine a target set of correspondences from the at least one set of correspondences based on the repetition-number-indicating information;

a querying submodule that is configured to query the target set of correspondences based on the target TBS to obtain the transmission repetition number corresponding to the target TBS; and a first number-determining submodule that is configured to determine the transmission repetition number corresponding to the target TBS as the target transmission repetition number.

In one or more embodiments of the present disclosure, the at least one set of correspondences is sent by the base station to the UE through high-layer signaling.

In one or more embodiments of the present disclosure, the set of correspondences includes a first correspondence between the first TBS and a first transmission repetition number that correspond to each other, and a second correspondence between the second TBS and number-indicating information that correspond to each other. The number-indicating information indicates a relative relationship of the second transmission repetition number corresponding to the second TBS with respect to the first transmission repetition number.

In one or more embodiments of the present disclosure, the repetition-number-indicating information indicates a third transmission repetition number corresponding to a third TBS. The second number-determining module 505 is configured to determine the target transmission repetition number based on the target TBS, the third TBS, and the third transmission repetition number.

In one or more embodiments of the present disclosure, the third transmission repetition number is included in a set of transmission repetition numbers. The set of transmission repetition numbers includes at least one of transmission repetition numbers supported by a communication protocol and is sent by the base station to the UE through the high-layer signaling.

In one or more embodiments of the present disclosure, the second number-determining module 505 includes:

a first relationship-determining submodule that is configured to determine a first relative relationship of the target transmission repetition number with respect to the third transmission repetition number based on a relative relationship between the target TBS and the third TBS, with the first relative relationship being a relative relationship of the target transmission repetition number with respect to the third transmission repetition number; and a second number-determining submodule that is configured to determine the target transmission repetition number based on the first relative relationship and the third transmission repetition number.

In one or more embodiments of the present disclosure, the second number-determining module 505 includes:

a second relationship-determining submodule that is configured to determine a second relative relationship of a reference transmission repetition number with respect to the third transmission repetition number based on the relative relationship of the target TBS with respect to the third TBS;

a third number-determining submodule that is configured to determine the reference transmission repetition number based on the second relative relationship and the third transmission repetition number; and a fourth number-determining submodule that is configured to determine the target transmission repetition number based on the reference transmission repetition number.

In one or more embodiments of the present disclosure, the fourth number-determining submodule is specifically configured to determine, based on the reference transmission repetition number, the target transmission repetition number, which is of a value among a target set of values that has a minimum difference from the reference transmission repetition number. The target set of values includes at least one value, and each of the at least one value is an integer multiple of a first preset value or an integer power of a second preset value.

In one or more embodiments of the present disclosure, the fourth number-determining submodule is specifically configured to determine, based on the reference transmission repetition number, the target transmission repetition number, which is one of transmission repetition numbers supported by the communication protocol that has a minimum difference from the reference transmission repetition number.

From the foregoing description, according to the apparatus for transmitting data provided by the embodiments of the present disclosure, by receiving repetition-number-indicating information carried in a target random access response sent by a base station, and transmitting, in accordance with a target transmission repetition number, target uplink data to the base station during a random access procedure, where the target transmission repetition number is determined based on the repetition-number-indicating information and a target TBS, a UE in the EDT technology can repeatedly transmit the target uplink data to the base station, thereby solving the problem of how the UE repeatedly transmits uplink data to the base station in the EDT technology.

Regarding the apparatus in the above embodiments, the specific manner in which each module performs its operation has been described in detail in the embodiments of the related method, and will not be repeated here.

Figure 8:
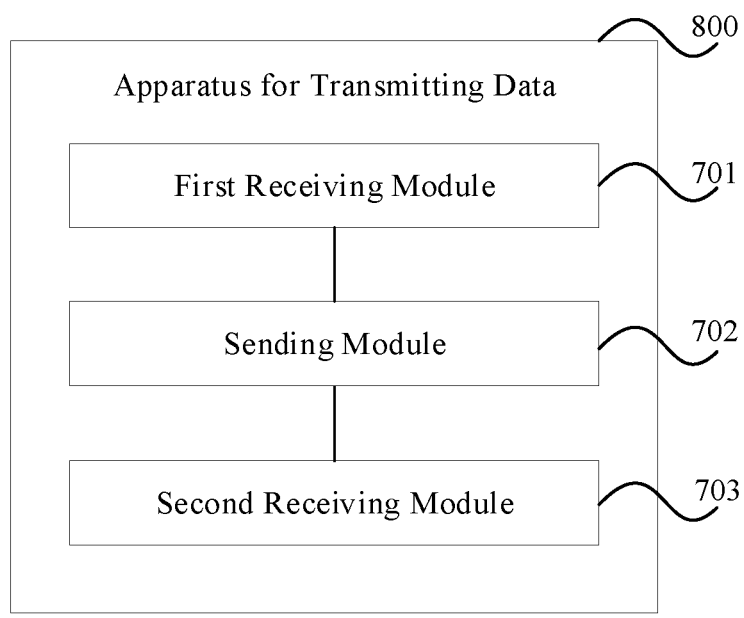
FIG. 8 is a block diagram illustrating an apparatus for transmitting data according to an example.

FIG. 8 is a block diagram illustrating an apparatus 800 for transmitting data according to an example. The apparatus 800 for transmitting data may be installed in the base station 10 shown in FIG. 1. Referring to FIG. 8, the apparatus 800 for transmitting data includes a first receiving module 701, a sending module 702 and a second receiving module 703.

The first receiving module 701 is configured to receive a target random access preamble sent by a UE. The target random access preamble indicates that the UE requests to transmit target uplink data to the base station during a random access procedure.

The sending module 702 is configured to send a target random access response to the UE based on the target random access preamble. The target random access response carries repetition-number-indicating information for the UE to determine a target transmission repetition number based on the repetition-number-indicating information and a target TBS. The target transmission repetition number indicates a number of times the UE is configured to repeatedly transmit the target uplink data to the base station during the random access procedure, and the target TBS is for the UE to transmit the target uplink data to the base station during the random access procedure.

The second receiving module 703 is configured to receive, during the random access procedure, the target uplink data that is transmitted by the UE in accordance with the target transmission repetition number.

In one or more embodiments of the present disclosure, the repetition-number-indicating information is configured to instruct the UE to determine a target set of correspondences from at least one set of correspondences stored in the UE. The target set of correspondences is for the UE to query based on the target TBS, to obtain and determine a transmission repetition number corresponding to the target TBS as the target transmission repetition number.

In one or more embodiments, each of the at least one set of correspondences includes at least one correspondence between TBS and transmission repetition number.

In one or more embodiments of the present disclosure, the at least one set of correspondences is sent by the base station to the UE through high-layer signaling.

In one or more embodiments of the present disclosure, the set of correspondences includes a first correspondence between a first TBS and a first transmission repetition number that correspond to each other, and a second correspondence between a second TBS and number-indicating information that correspond to each other. The number-indicating information indicates a relative relationship of a second transmission repetition number corresponding to the second TBS with respect to the first transmission repetition number.

In one or more embodiments of the present disclosure, the repetition-number-indicating information indicates a third transmission repetition number. The third transmission repetition number corresponds to a third TBS. The third transmission repetition number and the third TBS, in combination with the target TBS, are for the UE to determine the target transmission repetition number.

In one or more embodiments of the present disclosure, the third transmission repetition number is included in a set of transmission repetition numbers. The set of transmission repetition numbers includes at least one of transmission repetition numbers supported by a communication protocol and is sent by the base station to the UE through the high-layer signaling.

In one or more embodiments of the present disclosure, the repetition-number-indicating information is carried in an uplink scheduling grant for the target random access response.

From the foregoing description, according to the apparatus of transmitting data provided by the embodiments of the present disclosure, by sending repetition-number-indicating information carried in a target random access response to a UE, the UE can transmits, in accordance with a target transmission repetition number, target uplink data to a base station during a random access procedure, where the target transmission repetition number is determined based on the repetition-number-indicating information and a target TBS by the UE, so that the UE in the EDT technology can repeatedly transmit the target uplink data to the base station, thereby solving the problem of how the UE repeatedly transmits uplink data to the base station in the EDT technology.

Regarding the apparatus in the above embodiments, the specific manner in which each module performs its operation has been described in detail in the embodiments of the related method, and will not be repeated here.

Figure 9:
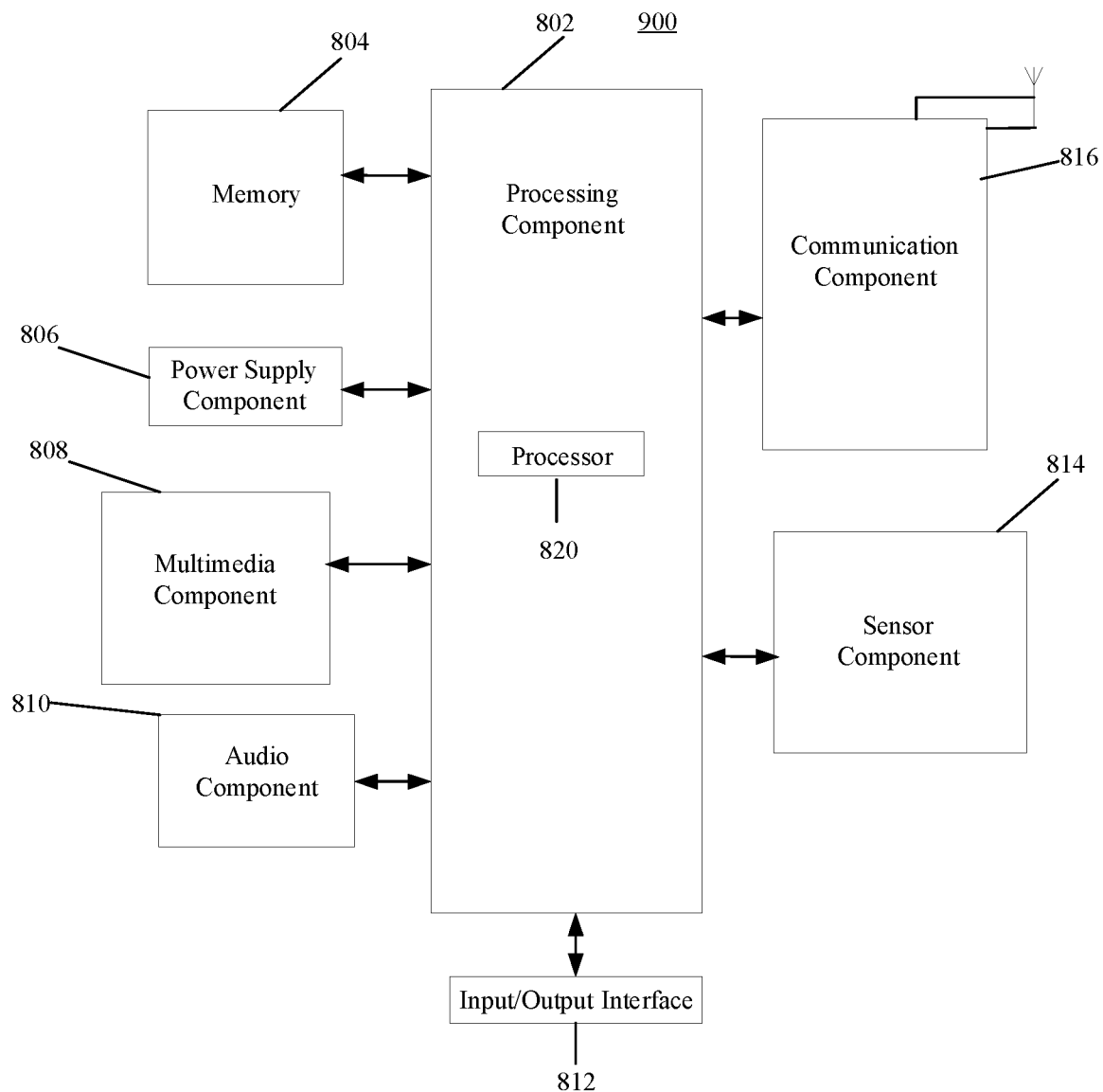
FIG. 9 is a block diagram illustrating a device for transmitting data according to an example.

FIG. 9 is a block diagram illustrating a device 900 for transmitting data according to an example. For example, the device 900 may be a terminal supporting an Internet of things communication based on the NB-IoT or the MTC, such as an intelligent watt-hour meter, a shared bicycle, an intelligent TV, an intelligent air conditioner, an intelligent temperature collector, or an intelligent humidity collecting component.

As shown in FIG. 9, the device 900 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the device 900, such as operations associated with display, phone calls, data communications, camera operations, and recording operations. The processing element 802 may include one or more processors 820 to execute instructions to complete all or part of the steps operated by the UE 20 in the above method embodiments. Moreover, processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support the operation of the device 900. Examples of such data include instructions for any application or method operated on the device 900, contact data, phonebook data, messages, pictures, videos, and the like. The memory 804 may be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power supply component 806 provides power to different components of the device 900. The power supply component 806 may include a power management system, one or more power supplies, and other components associated with generating, managing, and distributing power for the device 900.

The multimedia component 808 includes a screen providing an output interface between the device 900 and a user. In some embodiments, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 808 includes a front camera and/or a rear camera. The front camera and/or rear camera may receive external multimedia data when the device 900 is in an operating mode, such as a photographing mode or a video mode. Each front camera and rear camera may be a fixed optical lens system or have focal length and optical zooming capability.

The audio component 810 is configured to output and/or input an audio signal. For example, the audio component 810 includes a microphone (MIC) that is configured to receive an external audio signal when the device 900 is in an operating mode, such as a call mode, a recording mode, and a voice recognition mode. The received audio signal may be further stored in memory 804 or transmitted via communication component 816. In some embodiments, the audio component 810 also includes a speaker for outputting an audio signal.

The I/O interface 812 provides an interface between the processing component 802 and a peripheral interface module. The above peripheral interface module may be a keyboard, a click wheel, buttons, or the like. These buttons may include but not limited to, a home button, a volume button, a start button and a lock button.

The sensor component 814 includes one or more sensors to provide the device 900 with status assessments in various aspects. For example, the sensor component 814 may detect an open/closed state of the device 900 and a relative positioning of components such as the display and keypad of the device 900, and the sensor component 814 may also detect a change in position of the device 900 or a component of the device 900, the presence or absence of user contact with the device 900, orientation or acceleration/deceleration of the device 900, and temperature change of the device 900. The sensor component 814 may include a proximity sensor configured to detect the presence of a nearby object without any physical contact. The sensor component 814 may further include an optical sensor, such as a Complementary Metal-Oxide-Semiconductor (CMOS) or Charged Coupled Device (CCD) image sensor which is used in imaging applications. In some embodiments, the sensor component 814 may also include an acceleration sensor, a gyro sensor, a magnetic sensor, a pressure sensor, or a temperature sensor.

The communication component 816 is configured to facilitate wired or wireless communication between the device 900 and other devices. The device 900 may access a wireless network based on a communication standard, such as WiFi, 2G or 3G, or a combination thereof. In an example, the communication component 816 receives a broadcast signal or broadcast-associated information from an external broadcast management system via a broadcast channel. In an exemplary embodiment, the communication component 816 also includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the device 900 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the technical process operated by the UE 20 in the above method embodiments.

In an exemplary embodiment, there is also provided a non-transitory computer-readable storage medium including instructions, such as the memory 804 including instructions. The above instructions may be executed by the processor 820 of the device 900 to implement the technical process operated by the UE 20 in the above method embodiments. For example, the non-transitory computer-readable storage medium may be a Read-Only Memory (ROM), a Random Access Memory (RAM), a CD-ROM, a magnetic tape, a floppy disk, an optical data storage device, and the like.

Figure 10:
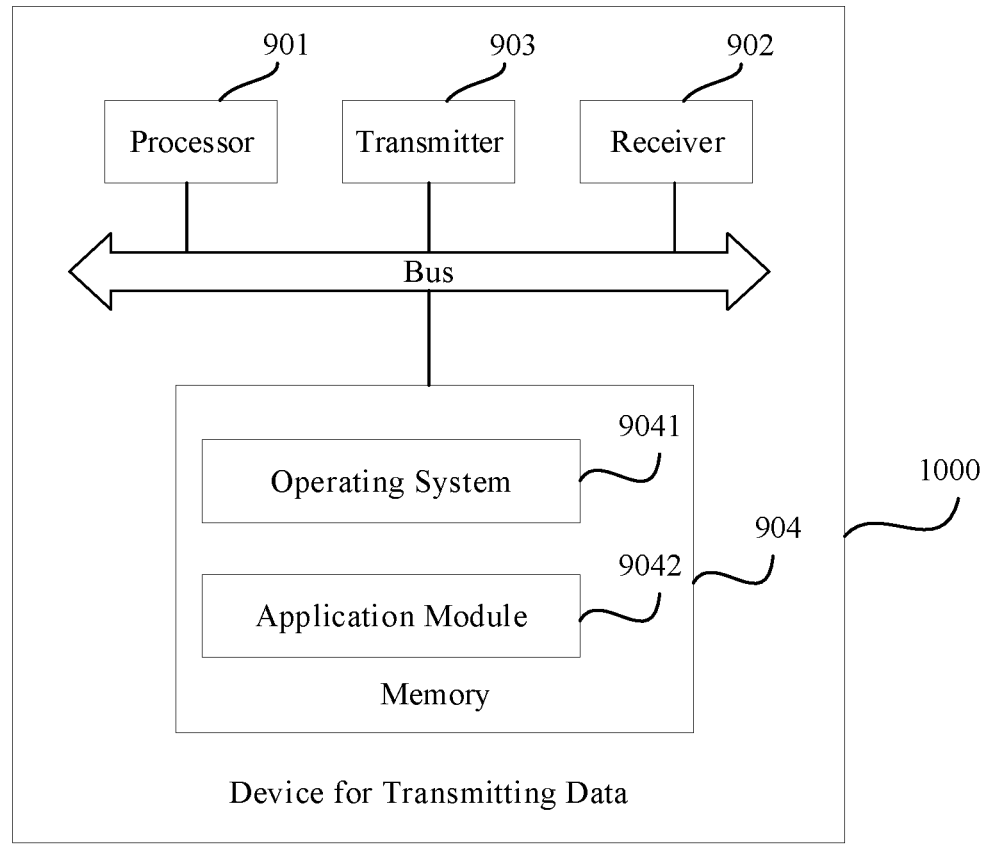
FIG. 10 is a block diagram illustrating a device for transmitting data according to an example.

FIG. 10 is a block diagram illustrating a device 1000 for transmitting data according to an example. For example, the device 1000 for transmitting data may be a base station. As shown in FIG. 10, the device 1000 for transmitting data may include: a processor 901, a receiver 902, a transmitter 903, and a memory 904. The receiver 902, the transmitter 903 and the memory 904 are connected to the processor 901 separately through a bus.

In one or more embodiments, the processor 901 includes one or more processing cores, and runs software programs and modules to perform the methods operated by the base station according to the methods of transmitting data provided by the embodiment of the present disclosure. The memory 904 may store the software programs and the modules. Specifically, the memory 904 may store an operating system 9041 and an application module 9042 meeting at least one function. The receiver 902 receives communication data transmitted by another device, and the transmitter 903 transmits communication data to another device.

Figure 11:
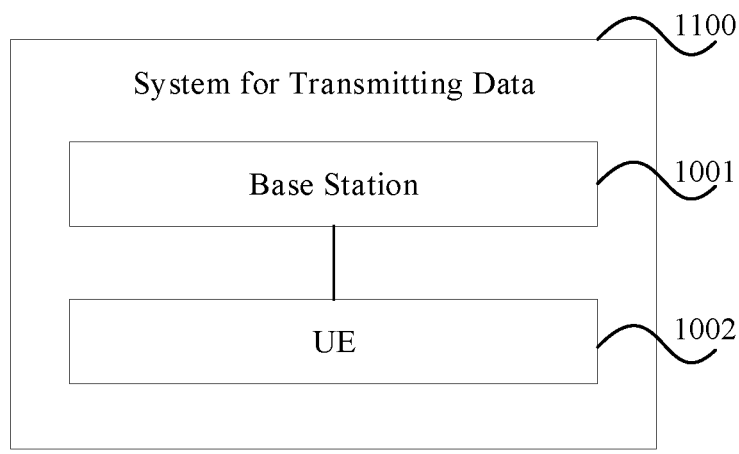
FIG. 11 is a block diagram illustrating a system for transmitting data according to an example.

FIG. 11 is a block diagram illustrating a system 1100 for transmitting data according to an example. As shown in FIG. 11, the system 1100 for transmitting data includes a base station 1001 and a UE 1002.

The base station 1001 is configured to execute the method of transmitting data operated by the base station according to the embodiment shown in FIG. 4.

The UE 1002 is configured to perform the method of transmitting data operated by the UE according to the embodiment shown in FIG. 4.

According to an example, there is also provided a computer-readable storage medium. The computer-readable storage medium is a non-volatile computer-readable storage medium in which a computer program is stored, and when the stored computer program is executed by the processing component, the methods of transmitting data provided by the foregoing embodiments of the present disclosure can be implemented.

According to an example, there is also provided a computer program product. The computer program product stores instructions, and when running on a computer, causes the computer to execute the methods of transmitting data provided by the embodiments of the present disclosure.

According to an example, there is also provided a chip. The chip includes a programmable logic circuit and/or program instructions, and when running, can execute the methods of transmitting data provided by the embodiments of the present disclosure.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Figure 12:
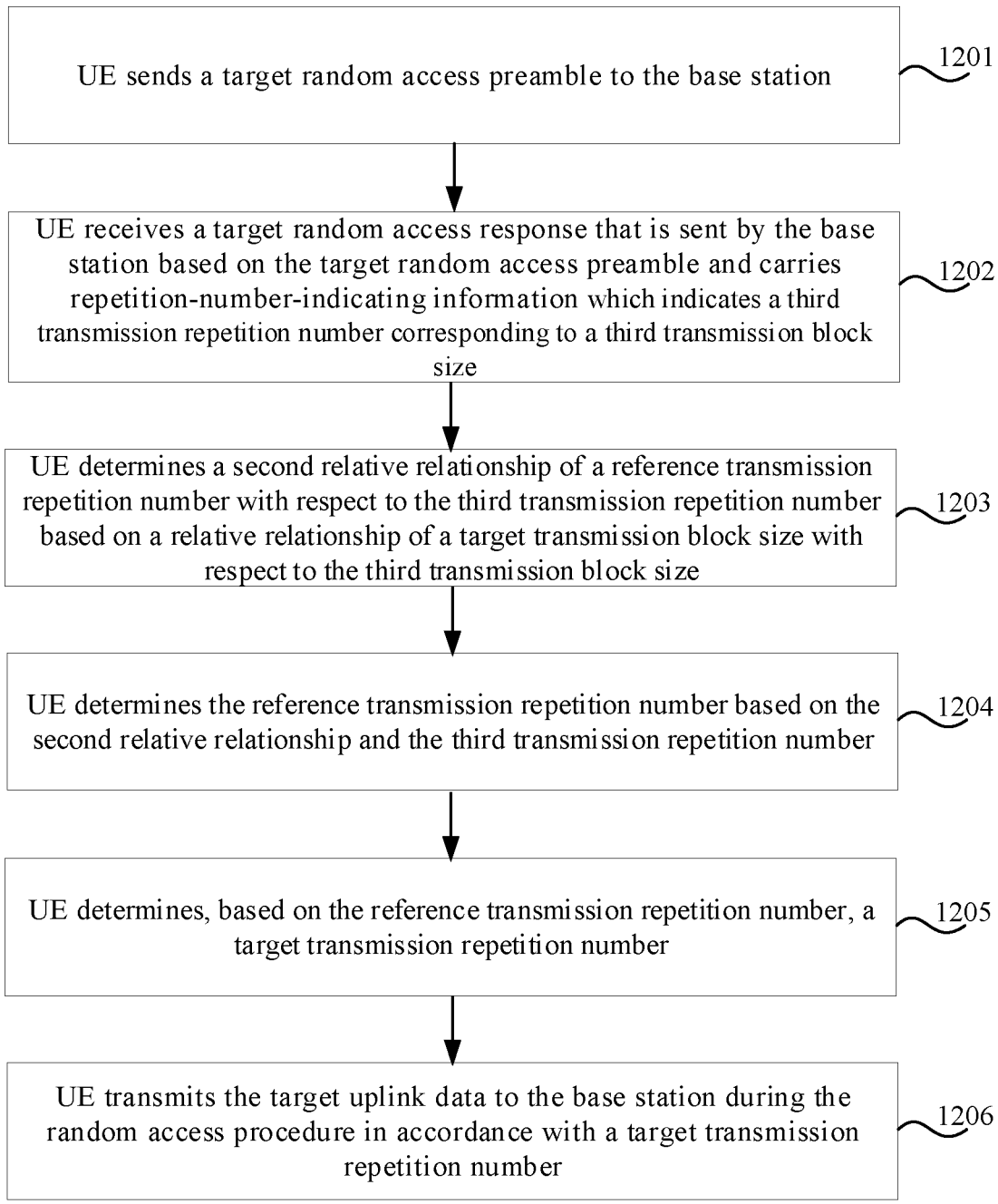
FIG. 12 is a flowchart illustrating a method of transmitting data according to an example.

Moreover, according to an example illustrated as FIG. 12, a method of transmitting data is provided and includes the following steps.

At step S1201, a user equipment sends to a base station a target random access preamble that indicates that the user equipment requests to transmit target uplink data to the base station during a random access procedure.

At step S1202, the user equipment receives a target random access response that is sent by the base station based on the target random access preamble and carries repetition-number-indicating information which indicates a third transmission repetition number corresponding to a third transmission block size.

At step S1203, the user equipment determines a second relative relationship of a reference transmission repetition number with respect to the third transmission repetition number based on a relative relationship of a target transmission block size with respect to the third transmission block size, wherein the target transmission block size is for the user equipment to transmit the target uplink data to the base station during the random access procedure.

At step S1204, the user equipment determines the reference transmission repetition number based on the second relative relationship and the third transmission repetition number;

At step S1205, the user equipment determines, based on the reference transmission repetition number, a target transmission repetition number that indicates a number of times the user equipment is configured to repeatedly transmit the target uplink data to the base station during the random access procedure.

The target transmission repetition number is a value that has a minimum difference from the reference transmission repetition number among a target set of values. The target set of values includes at least one value, and each of the at least one value is an integer multiple of a first preset value or an integer power of a second preset value.

At step S1206, the user equipment transmits, in accordance with the target transmission repetition number, the target uplink data to the base station during the random access procedure.

The reference transmission repetition number is determined based on the third transmission repetition number, the target transmission block size, and the third transmission block size.

In this example, the reference transmission repetition number is determined using a formula: $rep\_x*(TBS\_y/TBS\_x)$, where $rep\_x$ indicates the third transmission repetition number, $TBS\_y$ indicates the target transmission block size, and $TBS\_x$ indicates the third transmission block size.

In this example, the third transmission repetition number may be included in a set of transmission repetition numbers, and the set of transmission repetition numbers may include at least one of transmission repetition numbers supported by a communication protocol and is sent by the base station to the user equipment through high-layer signaling In this example, the repetition-number-indicating information may be carried in an uplink scheduling grant for the target random access response.

According to an example, a user equipment is provided and includes at least one processor; and a memory for storing instructions executable by the at least one processor. The at least one processor is configured to perform the method of transmitting data according to the above example.

According to an example, a computer-readable storage medium having a computer program stored thereof. When the stored computer program is executed by one or more processors, the method of transmitting data according to the above example is implemented.

According to an example, a method of transmitting data is provided and includes the following steps:

receiving, by a base station, a target random access preamble sent by a user equipment, wherein the target random access preamble indicates that the user equipment requests to transmit target uplink data to the base station during a random access procedure;

sending, by the base station based on the target random access preamble, a target random access response to the user equipment,
- where the target random access response carries repetition-number-indicating information which indicates a third transmission repetition number corresponding to a third transmission block size,
- where a relative relationship of a target transmission block size with respect to the third transmission block size is used for the user equipment to determine a second relative relationship of a reference transmission repetition number with respect to the third transmission repetition number, wherein the target transmission block size is for the user equipment to transmit the target uplink data to the base station during the random access procedure,
- where the second relative relationship and the third transmission repetition number are used for the user equipment to determine the reference transmission repetition number,
- where the reference transmission repetition number is used for the user equipment to determine a target transmission repetition number that indicates a number of times the user equipment is configured to repeatedly transmit the target uplink data to the base station during the random access procedure,
- where the target transmission repetition number is a value that has a minimum difference from the reference transmission repetition number among a target set of values, and
- where the target set of values includes at least one value, and each of the at least one value is an integer multiple of a first preset value or an integer power of a second preset value; and receiving, by the base station and during the random access procedure, the target uplink data that is transmitted by the user equipment in accordance with the target transmission repetition number;

where the reference transmission repetition number is determined based on the third transmission repetition number, the target transmission block size, and the third transmission block size.

In this example, the reference transmission repetition number is determined using a formula: rep_x*(TBS_y/TBS_x), where rep_x indicates the third transmission repetition number, TBS_y indicates the target transmission block size, and TBS_x indicates the third transmission block size.

In this example, the third transmission repetition number may be included in a set of transmission repetition numbers, and the set of transmission repetition numbers may include at least one of transmission repetition numbers supported by a communication protocol and is sent by the base station to the user equipment through high-layer signaling In this example, the repetition-number-indicating information may be carried in an uplink scheduling grant for the target random access response.

According to an example, a base station is provided and includes at least one processor; and a memory for storing instructions executable by the at least one processor. The at least one processor is configured to perform the method of transmitting data according to the above example.

According to an example, a computer-readable storage medium having a computer program stored thereof. When the stored computer program is executed by one or more processors, the method of transmitting data according to the above example is implemented.

According to an example, a data transmission system is provided and incudes the user equipment and the base station according to the above examples.

Other implementations of the present disclosure will be readily apparent to those skilled in the art after implementing the disclosure by referring to the specification. The present application is intended to cover any variations, uses, or adaptations of the present disclosure that are in accordance with the general principles thereof and include common general knowledge or conventional technical means in the art that are not disclosed in the present disclosure. The specification and embodiments therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

The invention claimed is:

1. A method of transmitting data, comprising:

sending, by a user equipment to a base station, a target random access preamble that indicates that the user equipment requests to transmit target uplink data to the base station during a random access procedure;

receiving, by the user equipment, a target random access response that is sent by the base station based on the target random access preamble and carries repetition-number-indicating information which indicates a third transmission repetition number corresponding to a third transmission block size;

determining, by the user equipment, a second relative relationship of a reference transmission repetition number with respect to the third transmission repetition number based on a relative relationship of a target transmission block size with respect to the third transmission block size, wherein the target transmission block size is for the user equipment to transmit the target uplink data to the base station during the random access procedure;

determining, by the user equipment, the reference transmission repetition number based on the second relative relationship and the third transmission repetition number;

determining, by the user equipment and based on the reference transmission repetition number, a target transmission repetition number that indicates a number of times the user equipment is configured to repeatedly transmit the target uplink data to the base station during the random access procedure,
- wherein the target transmission repetition number is a value that has a minimum difference from the reference transmission repetition number among a target set of values, and
- wherein the target set of values comprises at least one value, and each of the at least one value is an integer multiple of a first preset value or an integer power of a second preset value; and transmitting, by the user equipment and in accordance with the target transmission repetition number, the target uplink data to the base station during the random access procedure;
wherein the reference transmission repetition number is determined based on the third transmission repetition number, the target transmission block size, and the third transmission block size.

2. The method according to claim 1, wherein the reference transmission repetition number is determined using a formula: rep_x*(TBS_y/TBS_x), wherein rep_x indicates the third transmission repetition number, TBS_y indicates the target transmission block size, and TBS_x indicates the third transmission block size.

3. The method according to claim 1,
wherein the third transmission repetition number is comprised in a set of transmission repetition numbers, and
wherein the set of transmission repetition numbers comprises at least one of transmission repetition numbers supported by a communication protocol and is sent by the base station to the user equipment through high-layer signaling.

4. The method according to claim 1, wherein the repetition-number-indicating information is carried in an uplink scheduling grant for the target random access response.

5. A method of transmitting data, comprising:
receiving, by a base station, a target random access preamble sent by a user equipment, wherein the target random access preamble indicates that the user equipment requests to transmit target uplink data to the base station during a random access procedure;
sending, by the base station based on the target random access preamble, a target random access response to the user equipment,
wherein the target random access response carries repetition-number-indicating information which indicates a third transmission repetition number corresponding to a third transmission block size,
wherein a relative relationship of a target transmission block size with respect to the third transmission block size is used for the user equipment to determine a second relative relationship of a reference transmission repetition number with respect to the third transmission repetition number, wherein the target transmission block size is for the user equipment to transmit the target uplink data to the base station during the random access procedure,
wherein the second relative relationship and the third transmission repetition number are used for the user equipment to determine the reference transmission repetition number,
wherein the reference transmission repetition number is used for the user equipment to determine a target transmission repetition number that indicates a number of times the user equipment is configured to repeatedly transmit the target uplink data to the base station during the random access procedure,
wherein the target transmission repetition number is a value that has a minimum difference from the reference transmission repetition number among a target set of values, and
wherein the target set of values comprises at least one value, and each of the at least one value is an integer multiple of a first preset value or an integer power of a second preset value; and
receiving, by the base station and during the random access procedure, the target uplink data that is transmitted by the user equipment in accordance with the target transmission repetition number;
wherein the reference transmission repetition number is determined based on the third transmission repetition number, the target transmission block size, and the third transmission block size.

6. The method according to claim 5, wherein the reference transmission repetition number is determined using a formula: rep_x*(TBS_y/TBS_x), wherein rep_x indicates the third transmission repetition number, TBS_y indicates the target transmission block size, and TBS_x indicates the third transmission block size.

7. The method according to claim 5,
wherein the third transmission repetition number is comprised in a set of transmission repetition numbers, and
wherein the set of transmission repetition numbers comprises at least one of transmission repetition numbers supported by a communication protocol and is sent by the base station to the user equipment through high-layer signaling.

8. The method according to claim 5, wherein the repetition-number-indicating information is carried in an uplink scheduling grant for the target random access response.

9. A user equipment, comprising:
at least one processor; and
a memory for storing instructions executable by the at least one processor;
wherein the at least one processor is configured to:
send a target random access preamble to a base station, the target random access preamble indicating that the user equipment requests to transmit target uplink data to the base station during a random access procedure;
receive a target random access response that is sent by the base station based on the target random access preamble and carries repetition-number-indicating information which indicates a third transmission repetition number corresponding to a third transmission block size;
determine a second relative relationship of a reference transmission repetition number with respect to the third transmission repetition number based on a relative relationship of a target transmission block size with respect to the third transmission block size, wherein the target transmission block size is for the user equipment to transmit the target uplink data to the base station during the random access procedure;
determine the reference transmission repetition number based on the second relative relationship and the third transmission repetition number;
determine, based on the reference transmission repetition number, a target transmission repetition number that indicates a number of times the user equipment is configured to repeatedly transmit the target uplink data to the base station during the random access procedure,
wherein the target transmission repetition number is a value that has a minimum difference from the reference transmission repetition number among a target set of values, and
wherein the target set of values comprises at least one value, and each of the at least one value is an integer multiple of a first preset value or an integer power of a second preset value; and
transmit, in accordance with the target transmission repetition number, the target uplink data to the base station during the random access procedure;

wherein the reference transmission repetition number is determined based on the third transmission repetition number, the target transmission block size, and the third transmission block size.

10. The user equipment according to claim 9, wherein the reference transmission repetition number is determined using a formula: rep_x*(TBS_y/TBS_x), wherein rep_x indicates the third transmission repetition number, TBS_y indicates the target transmission block size, and TBS_x indicates the third transmission block size.

11. The user equipment according to claim 9,
wherein the third transmission repetition number is comprised in a set of transmission repetition numbers, and
wherein the set of transmission repetition numbers comprises at least one of transmission repetition numbers supported by a communication protocol and is sent by the base station to the user equipment through high-layer signaling.

12. The user equipment according to claim 9, wherein the repetition-number-indicating information is carried in an uplink scheduling grant for the target random access response.

13. A base station for implementing the method of claim 5, comprising:
at least one processor; and
a memory for storing instructions executable by the at least one processor;
wherein the at least one processor is configured to:
receive a target random access preamble sent by a user equipment, wherein the target random access preamble indicates that the user equipment requests to transmit target uplink data to the base station during a random access procedure;
send, based on the target random access preamble, a target random access response to the user equipment, wherein the target random access response carries repetition-number-indicating information which indicates a third transmission repetition number corresponding to a third transmission block size,
wherein a relative relationship of a target transmission block size with respect to the third transmission block size is used for the user equipment to determine a second relative relationship of a reference transmission repetition number with respect to the third transmission repetition number, wherein the target transmission block size is for the user equipment to transmit the target uplink data to the base station during the random access procedure,
wherein the second relative relationship and the third transmission repetition number are used for the user equipment to determine the reference transmission repetition number,
wherein the reference transmission repetition number is used for the user equipment to determine a target transmission repetition number that indicates a number of times the user equipment is configured to repeatedly transmit the target uplink data to the base station during the random access procedure,
wherein the target transmission repetition number is a value that has a minimum difference from the reference transmission repetition number among a target set of values, and
wherein the target set of values comprises at least one value, and each of the at least one value is an integer multiple of a first preset value or an integer power of a second preset value; and
receive, during the random access procedure, the target uplink data that is transmitted by the user equipment in accordance with the target transmission repetition number;
wherein the reference transmission repetition number is determined based on the third transmission repetition number, the target transmission block size, and the third transmission block size.

14. The base station according to claim 13,
wherein the reference transmission repetition number is determined using a formula: rep_x*(TBS_y/TBS_x), wherein rep_x indicates the third transmission repetition number, TBS_y indicates the target transmission block size, and TBS_x indicates the third transmission block size.

15. The base station according to claim 13,
wherein the third transmission repetition number is comprised in a set of transmission repetition numbers, and
wherein the set of transmission repetition numbers comprises at least one of transmission repetition numbers supported by a communication protocol and is sent by the base station to the user equipment through high-layer signaling.

16. The base station according to claim 13, wherein the repetition-number-indicating information is carried in an uplink scheduling grant for the target random access response.

17. A data transmission system, comprising the user equipment according to claim 9.

18. The data transmission system according to claim 17, further comprising the base station according to claim 13.

19. A computer-readable storage medium having a computer program stored thereon, wherein when the stored computer program is executed by one or more processors, the method according to claim 1 is implemented.

20. A computer-readable storage medium having a computer program stored thereon, wherein when the stored computer program is executed by one or more processors, the method according to claim 5 is implemented.

* * * * *